United States Patent [19]

Fears

[11] Patent Number: 5,304,236
[45] Date of Patent: Apr. 19, 1994

[54] COMPOSITION OF MATTER FOR LINING, COATING OR MANUFACTURING UNDERWATER STRUCTURES TO PREVENT LIVING MARINE ORGANISMS ADHERING TO OR BUILDING UP ON EXPOSED SURFACES

[76] Inventor: Clois D. Fears, 487 Cole Rd., Murrsyville, Pa. 15668

[21] Appl. No.: 872,017

[22] Filed: Apr. 22, 1992

[51] Int. Cl.$^5$ ............................................... C09D 5/14
[52] U.S. Cl. .......................... 106/15.05; 106/18.36; 106/639; 106/737; 106/816
[58] Field of Search ................ 106/639, 15.05, 18.36, 106/737, 816

[56] References Cited

U.S. PATENT DOCUMENTS

| | | | |
|---|---|---|---|
| 4,513,029 | 4/1985 | Sakai | 106/15.05 |
| 4,707,188 | 11/1987 | Tsuda et al. | 106/639 |

FOREIGN PATENT DOCUMENTS

| | | | |
|---|---|---|---|
| 58-069760 | 4/1983 | Japan | 106/639 |
| 2006183 | 5/1979 | United Kingdom | 106/639 |

OTHER PUBLICATIONS

Todd, "Sticky Situation A Mussel Invasion Threatens the Great Lakes", MacLeans, p. 23, Aug. 1990.
Cowley and Aguilar, "Showdown at Mussel Beach. Marauding Crustaceans Terrorize the Great Lakes", Newsweek, p. 66, No.v. 1989.
Voas, "Zebra Mussels Show Up 965 Miles Downstream", Pittsburgh Post Gazette, Sep. 1992.
Fleming, "Ballast Water Stowaways", Sea Frontiers, p. 23, Jun. 1991.
Hart, "Invasion of the Zebra Mussel", The Atlantic Monthly, pp. 81-87, Jul. 1990.
Graham, Jr., "Talk of the Trail", Audobon, pp. 8, 10, Sep. 1990.
Reynolds, "Invasion of the Zebra Mussel", Discover, p. 44, Jan. 1991.
Bretz, "Zebra Mollusks: A Danger of a Different Stripe", Electrical World, pp. 72-74, Dec. 1990.
"The Fleet Strikes Back at Zebra Mussels", Seaway Review, p. 83, Oct.-Dec. 1991.
Walker, "Dreissena Disaster: Scientits battle an invasion of zebra mussels", Science News, pp. 282-284, vol. 139, May 1991.
Laszewski, "Striped Menace: Zebra Mussels Found in Mississippi River", Underwater USA, p. 20, Nov. 1991.

*Primary Examiner*—Mark L. Bell
*Assistant Examiner*—Anthony J. Green
*Attorney, Agent, or Firm*—James Ray & Associates

[57] ABSTRACT

The present invention provides a and methods of using such composition which will substantially minimize the detrimental adherence to and buildup of living marine organisms on exposed surface areas of underwater structures. Such composition of matter includes a mixture of cement, sand and an anti-fouling agent. According to the methods disclosed the composition of matter can be used to line or coat surface areas of existing underwater structures or to manufacture an underwater structure totally with such composition of matter.

13 Claims, No Drawings

COMPOSITION OF MATTER FOR LINING, COATING OR MANUFACTURING UNDERWATER STRUCTURES TO PREVENT LIVING MARINE ORGANISMS ADHERING TO OR BUILDING UP ON EXPOSED SURFACES

FIELD OF THE INVENTION

The present invention relates, in general, to preventing living marine organisms attaching themselves to exposed surface areas of underwater structures and, more particularly, the present invention relates to a composition of matter that has been specifically formulated for use in at least one of lining or coating an exposed surface area of an existing predetermined underwater structure and which additionally can be used to manufacture entirely therefrom such predetermined underwater structure that, in normal use thereof, will be exposed to such living marine organisms. Still more specifically, the instant invention relates to methods of using the composition of matter to line or coat the exposed surface areas of such existing underwater structures and to a method of manufacturing such underwater structures from the new composition of matter.

BACKGROUND OF THE INVENTION

Prior to the instant invention, in todays modern power generation plants and other manufacturing industries, which require the use of relatively large volumes of water, it is a well recognized problem that there is a potential loss of water from the adherence to and buildup of a variety of foreign substances on the exposed surfaces of fluid transport systems. Such exposed surfaces of the fluid transport systems include, but are not necessarily limited to, the inner surfaces of the water intake pipes, valves, fittings, heat exchangers, etc, and the outer surfaces of screens (rotary & bar), etc.. Power generating plants and other manufacturing facilities which require the use of a particular fluid medium, such as fresh water, have long sought an effective method of keeping the fluid transport system operational and free of any buildup of foreign organisms or debris.

One such foreign organism of particular concern and discovered recently is the D. polymorpha or Zebra Mollusks. Such Zebra Mollusks are better known in the art as Zebra Mussels. See, for example, an article published in the December 1990 issue of "Electrical World" on pages 72-74 and another article published in the July 1990 issue of "The Atlantic Monthly" on pages 81-87. The disclosures of these particular articles are incorporated herein by reference thereto.

Prior to the present invention, when the fluid transport systems of present day technology exhibit any significant diminished capacity due to clogging by foreign substance buildup, one method used for cleaning the submerged piping system is pulling a dragging device through the submerged piping system to dislodge the buildups or clogs and subsequently to pull them through to the exit for manual cleanup. There are significant drawbacks to this prior art method which are readily apparent and would, for example, include the fact that this method is not only labor-intensive but it is also time-consuming. Furthermore, this method cannot be accomplished continuously, but must be done on a regularly scheduled basis.

Another cleaning method which has been used for industrial facilities, such as water treatment plants, includes flushing the fluid transport system with relatively large quantities of chemicals. These chemicals are known to include chlorine and potassium chloride. While this prior art process can normally be conducted in a continuous manner, it is not efficient or cost-effective to induce large quantities of these chemicals into the fluid medium. Depending on the end use of the fluid, these chemicals, in some cases, may be detrimental and when this is the case they must later be separated out.

As discussed in the above-referenced articles, at least three types of problems have already been identified with Zebra-Mussel fouling in water intake systems. Initially, layers of attached mussels will reduce or block flow, even through large-diameter piping, trash racks, and traveling screens. Eventually, shells or clumps of shells breaking free of their attachment sites can block openings in piping, heat exchangers, strainers, or traveling screens. Finally, attachment points accumulate other debris further reducing water flow and serving as sites for corrosion.

At the present time, there are three EPA-approved chemical methods that have been tried in the United States powerplants. These chemical methods are chlorination, the most discussed method; bromination, primarily Acti-brom, a Nalco Chemical Co. (Naperville, Ill.) product; and Betz Laboratories' (Trevose, Pa.) Clam-trol. Several other chemical treatments have been tried in laboratory tests, but not in a utility or industrial environment. To date chlorination is the most commonly used chemical control for Zebra-Mussel fouling. Continuous chlorination at 0.3 ppm for up to three weeks is required to achieve efficacy. However, intermittent chlorination programs that feed a few hours daily have generally been found to be ineffective. Using other chemicals-such as ozone, hydrogen peroxide, and potassium permanganate is possible. Use of these chemicals, however, are expensive, environmentally unsound, and/or impractical to distribute throughout a fluid transport system.

It has been reported that Detroit Edison is trying to control Zebra Mussels by scraping and hydroblasting during regular maintenance. Janiece Romstadt has received federal government permission to use a commercial mollucicide. Ontario Hydro is treating some of its coolant with hypochlorite, an oxidant that chews away at the soft parts of the organism and is the active ingredient in household bleach; the utility admits, however, that this short-term solution is offensive to a public anxious about the environment. One alternative is ozonation. Like hypochlorite, ozone is an oxidant; it is also environmentally benign. But it is extremely expensive. Ontario Hydro estimates that use of ozonation would cost it $9 million per/plant per/year.

One member, of the U.S. Fish and Wildlife Service, puts the bill for re-engineering, maintenance, and other forms of mussel abatement at almost half a billion dollars a year. But none of the emergency measures, though they may alleviate specific problems here and there, will do anything to halt the overall proliferation of Zebra Mussels. The mussels are very strongly byssate and they will attach to insides and occlude the openings of industrial and domestic pipelines, clog underground irrigation systems of farms, greenhouses, and any other facility that draws water directly from the Great Lakes, encrust navigation buoys to the point of submerging them, and encrust hulls of boats and other types of sailing craft that remain in the water over the summer and fall. The mussels may also become a significant vector of parasites that are lethal to game species of waterfowl and fish.

In the November 1991 issue of "Underwater USA" a news article appeared which indicated that, the tiny but dreaded Zebra Mussel has been discovered for the first time in a section of the Mississippi River near La Crosse, Wis., a U.S. Fish and Wildlife Service toxicologist reports.

One expert says that he expects to see the Zebra Mussel population explode by next year. Worse, it's likely boaters will inadvertently introduce the Zebra Mussels to Minnesota lakes.

The mussels have an extremely hard shell and clog water intakes at power plants and municipal water systems. The Monroe, Mich., water supply was crippled for three days when the mussels clogged an intake pipe. As a result, water bills increased 18 percent to pay for the cost of removing them. An Ontario electric company spent $10 million on chlorine to keep the mussels out of power plant water intake pipes. This expert expects the same things to happen at power and water plants on the Mississippi. He says locks and dams also are favored by the mussels, which have the potential to cause leaks and even prevent control gates from closing completely.

Applicant is aware of another material presently being marketed to control marine fouling of boat hulls. This material was developed by a chemical company in the eighties. Use of this material, however, is difficult and to date has not been tried on fluid transport systems. It requires a considerable amount of preparation of the substrate before it can be applied.

The material includes a primer. This primer is a very low viscosity, 100% epoxy undercoat. Like wood preservative it has very high "wicking" characteristics. Only one light coat is required. It may be sprayed without thinning. A quart will cover approximately 400 square feet (approximately the wetted surface of a 42 foot full keel sailboat.) This is a tack coat and should be applied similar to a wax as opposed to a paint application. A thick coat will cause a top coat of the material to run and bleed. The primer will cure to a "tacky" surface in 3 to 4 hours. It is only to be used as an undercoat and will oxidize if not covered with a finish coat. The finish coat may be applied at anytime after the surface becomes "tacky" to touch, but within an 8 hour window.

Preparation of the top coating material is now ready. This material is subject to settling; seven different ingredients are used to obtain its unique qualities of strength, flexibility, electrical-resistance, and anti-fouling properties. To assure uniformity Part A of the material must be thoroughly mixed to a uniform "cake icing" consistency before adding Part B, the hardener. Mixing should be done using an electric drill and a paint mixing agitator. It is good practice to mix Part A each time prior to removing sub-lots from the primary container. Care must be taken when mixing the material in the plastic container. The agitator should have no protruding edges that might cut the plastic. Plastic slivers may get in the mix and ultimately clog the spray nozzle. In addition, the hardener must be thoroughly mixed before adding to Part A. Three parts by volume of Part A, the epoxy base, is mixed with 1 part by volume of Part B, the activator. At 70 degrees F. the mixture has the consistency of dry wall joint compound. Heated to 110 degrees F. the consistency is that of latex paint. The potlife at 70 degrees F. is about 1 hour, and at 105 degrees F. is about 20 minutes.

The material is now ready for application. One serious drawback of this material is that careful attention must be paid to the material's application window; the material should be applied while the primer is still "tacky". If the application window is missed, the surface should be re-profiled with 60-80 grit sandpaper, cleaned, and lightly covered again with the primer before proceeding. The material is applied using a standard cup gun commonly used in automobile painting. Add Part A and Part B to the cup in the proper proportion and blend. Add 15-20% solvent to the cup and close immediately.

Mix the components by shaking and swirling the gun. Spray using 60-80 psi air pressure.

A 0.001-0.002 inch thick tack coat is first sprayed over the primer and then followed in 10-45 minutes by a 0.004-0.005 inch thick coat. Following with a full 0.003-0.005 inch coat until a finish thickness of 0.017-0.020 inch is obtained. Re-coats may be applied every 10-15 minutes at 70 degrees F. Runs may occur if coats are too thick, subjected to very warm environments, or exposed to direct sunlight. Another disadvantage of this material is that operator judgement is critical when application is done at less than ideal conditions.

If the cup gun does not have an agitator, the gun must be frequently shaken with a rapid wrist motion to keep a uniform mixture. A pressure pot may be used for larger jobs. A Bink's model 7 gun, a 2 gallon Bink's pot with agitator, model #83-5508, air regulator model #85-204 and a 38 PM nozzle combination has been used successfully. The 38 PM nozzle is quite large (about 0.086") and the applicator may prefer a nozzle in the 0.060 range to obtain greater control of film thickness.

The material is allowed to cure for twenty-four to forty-eight (24 to 48) hours, depending on ambient conditions, before activating. This activation step is very important, because barnacles will grow on unactivated material. Lightly sandblasting, either wet or dry, with 40F grit or finer will activate the surface or lightly sand with 220 wet/dry paper to remove blush. The longer the cure time before activating the easier it is to activate successfully. The material will continue to cure for a week at 70 degrees F.

Although the material is formulated for highly moist environments and will cure under water, it should not be applied to damp surfaces.

Therefore, it is apparent that it is desirable to create a fluid transport system in which the pipes and other system components are manufactured, or lined, or coated with a material which would substantially minimize the initial adherence to and eventual buildup of foreign substances on the inner surfaces of the pipes and the exposed surfaces of other system components while they are submerged in a fluid medium.

SUMMARY OF THE INVENTION

In a first aspect, the present invention provides a composition of matter specifically formulated for use in at least one of lining and coating an exposed surface area of an existing predetermined underwater structure therewith and manufacturing entirely therefrom a predetermined underwater structure. These underwater structures, during a normal use thereof, are exposed to living marine organisms which can both detrimentally adhere to and buildup on such exposed surface area thereof. The invented composition of matter being at least capable of substantially minimizing such detrimental adherence to and buildup of such living marine organisms on the exposed surface areas of such predetermined underwater structures during such normal use. Such composition of matter includes a predetermined percent by volume, on a dry basis, of a predetermined cement. This predetermined percent by volume of cement will be present in such composition of matter in an amount which is at least sufficient to provide the composition of matter a requisite amount of both adhesion capability during curing thereof and rigidity after curing of the composition of matter. Also, there is a predetermined percent by volume, on a dry basis, of sand. Such sand having a predetermined particle size distribution. The predetermined percent by volume of sand being present in the composition of matter in an amount which is at least sufficient to provide such composition of matter a requisite amount of bonding sites for the cement and at least some strength to such composition of matter after such curing. Finally there is a predetermined percent by volume, on a dry basis, of a preselected anti-fouling agent. Such predetermined percent by volume of the preselected anti-fouling agent being present in such composition of matter in an amount which is at least sufficient to provide the composition of matter a capability of substantially minimizing both any detrimental adherence to and buildup of such living marine organisms on the exposed surface areas of such underwater structure.

In another aspect of the present invention, there is taught a method of protecting exposed surface areas of predetermined underwater structures against both detrimental adherence to and buildup of living marine organisms thereon. Such method comprising the steps of first providing a composition of matter in which a predetermined percent by volume, on a dry basis, of a predetermined cement, which is at least sufficient to provide such composition of matter a requisite amount of both adhesion capability during curing thereof and rigidity after such curing of the composition of matter, is thoroughly mixed with a predetermined percent by volume, on a dry basis, of sand. This sand, having a predetermined particle size distribution, is present in the composition of matter in an amount which is at least sufficient to provide the composition of matter a requisite amount of bonding sites for the cement and at least some strength to such composition of matter after curing. The composition of matter also has a predetermined percent by volume, on a dry basis, of a preselected anti-fouling agent. The anti-fouling agent is present in the composition of matter in an amount which is at least sufficient to provide the composition of matter a capability of substantially minimizing both any detrimental adherence to and buildup of such living marine organisms on the exposed surface areas of such underwater structure. Second, the method include the step of mixing a predetermined volume of water with the composition of matter provided in step one. Such predetermined volume of water being at least sufficient to activate the cement and cause the composition of matter to become a coherent mass. Thereafter, the method calls for applying a predetermined minimum thickness of such coherent mass achieved in the second step to the exposed surface areas of the predetermined underwater structures as at least one of a lining and a coating. Finally, the method includes the step of curing the at least one of such lining and coating applied in step three.

In a final aspect, the present invention provides a method of manufacturing predetermined underwater structures which, during use in water, are capable of substantially minimizing both detrimental adherence to and buildup of living marine organisms on exposed surface areas thereof. This method includes the steps of first determining an underwater structure to be manufactured and then providing a mold having an inner surface substantially identical in configuration to the exposed surface areas of such underwater structure to be manufactured determined in step one. Thereafter, providing a composition of matter in which a predetermined percent by volume, on a dry basis, of a predetermined cement, which is at least sufficient to provide the composition of matter a requisite amount of both adhesion capability during curing thereof and rigidity after curing of such composition of matter, is thoroughly mixed with a predetermined percent by volume, on a dry basis, of sand. This sand having a predetermined particle size distribution. The sand is present in such composition of matter in an amount which is at least sufficient to provide the composition of matter a requisite amount of bonding sites for such cement and at least some strength to the composition of matter after curing and a predetermined percent by volume, on a dry basis, of a preselected anti-fouling agent. This anti-fouling agent is present in the composition of matter in an amount which is at least sufficient to provide such composition of matter a capability of substantially minimizing both any detrimental adherence to and buildup of such living marine organisms on the exposed surface areas of such underwater structure. Thereafter, mixing a predetermined volume of water with such composition of matter. The predetermined volume of water being at least sufficient to activate the cement and cause such composition of matter to become a coherent mass. Then placing such coherent mass into the mold. Allowing such coherent mass placed in the mold to cure; and then removing such underwater structure from such mold.

OBJECTS OF THE INVENTION

It is, therefore, one of the primary objects of the present invention to provide a composition of matter specifically formulated to substantially minimize a detrimental adherence to and build up of living marine organisms on the exposed surface areas of an underwater structure when applied thereto.

Another object of the present invention is to provide a composition of matter which can be used as a lining or coating on an exposed surface area of an underwater structure.

Still another object of the present invention is to provide a composition of matter which can be used to manufacture an underwater structure.

Yet another object of the present invention is to provide a composition of matter in which a number of anti-fouling agents can be incorporated therein.

A further object of the present invention is to provide a composition of matter in which a reinforcing material can be added.

An additional object of the present invention is to provide a composition of matter in which a plastisizing agent can be added therein.

Still yet another object of the present invention is to provide a method of protecting exposed surface areas of underwater structures against both detrimental adherence to and buildup of living marine organisms utilizing a composition of matter specifically formulated for this application and applied to such exposed surface areas.

It is an additional object of the present invention is to provide a method of manufacturing predetermined underwater structures utilizing a composition of matter which is capable of substantially minimizing both detrimental adherence to and buildup of living organisms on the exposed surface areas thereof.

Yet still another object of the present invention is to provide a composition of matter and methods of using such composition of matter which will reduce the corrosion potential of underwater structures.

In addition to the above described objects and advantages of the present invention, various other objects and advantages of the invention will become more readily apparent to these persons skilled in the marine organism anti-fouling art from the following more detailed description of the invention, particularly, when such description is taken in conjunction with the appended claims.

DESCRIPTION OF THE INVENTION

The present invention is directed to a composition of matter that has been specifically formulated for use on an exposed surface area of an existing predetermined underwater structure. This composition of matter can be used as either a lining, such as, in an underwater pipe or as a coating on the exposed surface areas of other underwater structures.

Additionally, the composition of matter can be used to manufacture therefrom such predetermined underwater structures. During the normal use of these underwater structures the surface areas are exposed to living marine organisms which can both detrimentally adhere to and buildup on exposed surface areas. The composition of matter taught herein is at least capable of substantially minimizing this detrimental adherence to and buildup of living marine organisms of the exposed surface areas of such predetermined underwater structures during their normal use.

According to the present invention the composition of matter includes a predetermined percent by volume, on a dry basis, of a predetermined cement. This cement is preferably, a portland or hydraulic cement. This predetermined percent by volume of cement is present in the composition of matter in an amount which is at least sufficient to provide the composition of matter a requisite amount of both adhesion capability during curing and rigidity after curing. A preferred range of cement present in the composition of matter is between about 20.0 percent and about 25.0 percent with the most preferred range being between about 22.0 percent and about 25.0 percent.

Another component in the composition of matter is a predetermined percent by volume, on a dry basis, of sand. This sand has a predetermined particle size distribution and is preferably a fine mason sand. The predetermined particle size distribution of the mason sand present in the composition of matter, in a presently preferred embodiment, is such that 100 percent passes a No. 4 mesh, 99.0 percent passes a No. 8 mesh, 24.0 percent passes a No. 100 mesh and 1.0 percent passes a No. 200 mesh. Alternatively, the predetermined particle size of the mason sand present in the composition of matter is such that 99.5 percent passes a No. 16 mesh, 95.8 percent passes a No. 30 mesh, 58.6 percent passes a No. 50 mesh, 13.3 percent passes a No. 100 mesh and 2.6 percent passes a 200 mesh. The predetermined percent by volume of such sand is present in the composition of matter in an amount which is at least sufficient to provide the composition of matter a requisite amount of bonding sites for the cement and at least some strength to the composition of matter after curing. In order to achieve this requisite amount of bonding sites and strength the sand should be present in the composition of matter in a range of between about 60.0 percent and about 75.0 percent. A more preferred range being in a range of between about 66.0 percent and about 70.0 percent.

The final essential element of the composition of matter, according to the present invention, is a predetermined percent by volume, on a dry basis, of a preselected anti-fouling agent. This predetermined percent by volume of such preselected anti-fouling agent is present in the composition of matter in an amount which is at least sufficient to provide such composition of matter the capability of substantially minimizing both any detrimental adherence to and buildup of the living marine organisms on the exposed surface areas of the underwater structures.

In the presently preferred embodiment the preselected anti-fouling agent present in such co position of matter is selected from the group consisting of copper, copper compounds, organotin, zinc, zinc compounds and various mixtures thereof. Either copper alone or as part of a mixture with organotin or zinc, in the presently preferred embodiment, will be a powdered copper metal which will have a particle size distribution in which at least about 90.0 percent will pass a 100 mesh. One presently preferred zinc compound is zinc dimethyldithiocarbamate.

The above-described composition of matter, according to one presently preferred embodiment of the invention will further include a reinforcing material. This reinforcing material will generally be present in the composition of matter in an amount which will be at least sufficient to provide a predetermined strength to such composition of matter after curing. Such reinforcing material will preferably be a metallic fiber. One example of a metallic fiber suitable for use in the composition of matter is steel and may be present in such composition of matter in a volume percent, on a dry basis, of up to about 5.0 percent.

Further the composition of matter may include a predetermined percent by volume, on a dry basis, of a predetermined plastisizing agent, such as, for example, a polymer modifying agent. Preferably such plastisizing agent will be present in the composition of matter in a volume percent, on a dry basis, of up to about 5.0 percent.

According to another embodiment of the present invention, there is provided a method of protecting the exposed surface area of predetermined underwater structures against both the detrimental adherence to and buildup of living marine organisms thereon. Such method includes the step of providing a composition of matter in which a predetermined percent by volume, on a dry basis, of a predetermined cement which is thoroughly mixed with a predetermined percent by volume, on a dry basis, of sand and a predetermined percent by volume, on a dry basis, of a preselected anti-fouling agent. Each of these components present in the composition of matter have been described in detail above and, for the sake of brevity, will not be repeated here.

The next step of this method involves mixing a predetermined volume of water with the composition of matter. Such predetermined volume of water is an amount that will be at least sufficient to activate the cement and cause the composition of matter to become a coherent mass.

Thereafter, a predetermined minimum thickness of such coherent mass is applied to the exposed surface areas of the predetermined underwater structures. Application of such predetermined minimum thickness may be in the form of a lining, such as, in a pipe or as a coating. This predetermined minimum thickness applied will be at least about one-sixteenth of an inch thick. Preferably this minimum thickness will be in a range of between about one-quarter of an inch and about 1.0 inch.

Finally, the method includes the step of curing such at least one of a lining and a coating applied to the exposed surface areas of the predetermined underwater structure.

It may be desirable for the method to include the additional step of abrading the surface of the lining or coating applied to the exposed surface areas of the underwater structure. In this manner a greater exposure of the anti-fouling agent would be expected. The abrading of the surface can be readily achieved by either sanding o sand blasting.

It is also within the scope of the present invention for such predetermined minimum thickness of the coherent mass to be applied to such exposed surface areas of predetermined underwater structures while they are submerged beneath a surface of water. In this case, the method must include the additional step of evacuating water adjacent the exposed surface areas to be lined or coated with the composition of matter.

The present invention further provides a method of manufacturing predetermined underwater structures which, during their use beneath the surface of water, are capable of substantially minimizing both detrimental adherence to and buildup of living marine organisms on the exposed surface areas thereof. This method involves first determining an underwater structure to be manufactured and providing a mold having an inner surface which is substantially identical in configuration to the exposed surface areas of the underwater structure to be manufactured.

Thereafter, providing a composition of matter in which a predetermined percent by volume, on a dry basis, of a predetermined cement is thoroughly mixed with a predetermined percent by volume, on a dry basis, of sand and a predetermined percent by volume, on a dry basis, of a preselected anti-fouling agent. As mentioned above, each of these components in the composition of matter have been described and their further description, for the sake of brevity, will not be repeated here.

A predetermined volume of water is then mixed with such composition of matter. Such predetermined volume of water being an amount which will be at least sufficient to activate the cement and cause the composition of matter to become a coherent mass which is then placed into the mold. The coherent mass placed in the mold is allowed to cure and then the underwater structure thus manufactured is removed from the mold. It should be understood that removal of the underwater structure from the mold can be accomplished by either removing the mold from the structure as well as removing the structure from the mold.

Preferably this method includes the additional step of exposing the anti-fouling agent present in the composition of matter adjacent selected exposed surfaces areas of the underwater structure, such as, by abrading as discussed above. It is also preferred that the method includes the additional step of reinforcing the underwater structure to be manufactured.

While a number of presently preferred and alternative embodiments of the invention have been discussed in considerable detail above, it should be obvious to those persons who are skilled in the art that various other modifications and adaptations of the present invention can be made without departing from the spirit and the scope of the appended claims.

I claim:

1. A composition of matter specifically formulated for use in at least one of lining and coating an exposed surface area of an existing underwater structure therewith and manufacturing entirely therefrom an underwater structure which, during a normal use thereof, will be exposed to Zebra Mussels which can both detrimentally adhere to and buildup on these exposed surface areas, said composition of matter being capable of substantially minimizing this detrimental adherence to and buildup of Zebra Mussels on these exposed surface areas of underwater structures, said composition of matter comprising:

(a) a first percent by volume, on a dry basis, of cement, said first percent by volume of said cement being present in said composition of matter in an amount of between about 20.0 percent to about 25.0 percent which is sufficient to provide said composition of matter a requisite amount of both adhesion capability during curing thereof and rigidity after curing of said composition of matter;

(b) a second percent by volume, on a dry basis, of sand, having a particle size distribution in which 100 percent passes a No. 4 mesh, 99 percent passes a No. 8 mesh, 24 percent passes a No. 100 mesh and 1 percent passes a No. 200 mesh screen, said second percent by volume of said sand being present in said composition of matter in an amount of between about 60.0 percent to about 75.0 percent which is sufficient to provide said composition of matter a requisite amount of bonding sites for said cement and at least some strength to said composition of matter after curing; and (c) a third percent by volume, on a dry basis, of an anti-fouling agent, said third percent by volume of said anti-fouling agent being present in said composition of matter in an amount which is at least sufficient to provide said composition of matter a capability of substantially minimizing both any detrimental adherence to and buildup of said Zebra Mussels on said exposed surface areas of said under water structure.

2. A composition of matter, according to claim 1, wherein said anti-fouling agent present in said composition of matter is selected from the group consisting of copper, copper compounds, organotin, zinc, zinc compounds and various mixtures thereof.

3. A composition of matter, according to claim 2, wherein said anti-fouling agent present in said composition of matter is powdered copper metal.

4. A composition of matter, according to claim 3, wherein said powdered copper metal has a particle size distribution in which at least about 90.0 percent will pass a 100 mesh.

5. A composition of matter, according to claim 2, wherein one of said zinc compounds is zinc dimethyldithiocarbamate.

6. A composition of matter, according to claim 1, wherein said cement present in said composition of matter is hydraulic cement.

7. A composition of matter, according to claim 1, wherein said sand present in said composition of matter is a fine mason sand.

8. A composition of matter, according to claim 7, wherein said particle size distribution of said mason sand present in said composition of matter is such that 99.5 percent passes a No. 16 mesh, 95.8 percent passes a No. 30 mesh, 58.6 percent passes a No. 50 mesh, 13.3 percent passes a No. 100 mesh and 2.6 percent passes a No. 200 mesh.

9. A composition of matter, according to claim 1, wherein said composition of matter further includes a reinforcing material present in said composition of matter in an amount sufficient to provide a requisite amount of strength to said composition of matter after such curing.

10. A composition of matter, according to claim 9, wherein said reinforcing material present in said composition of matter is a metallic fiber.

11. A composition of matter, according to claim 10, wherein said metallic fiber is present in said composition of matter in a volume percent, on a dry basis, of up to about 5.0 percent.

12. A composition of matter, according to claim 1, wherein said composition of matter further includes a percent by volume, on a dry basis, of a plastisizing agent.

13. A composition of matter, according to claim 12, wherein said plastisizing agent is present in said composition of matter in a volume percent, on a dry basis, of up to about 5.0 percent.

* * * * *